(12) United States Patent
Andersson et al.

(10) Patent No.: US 11,621,989 B2
(45) Date of Patent: *Apr. 4, 2023

(54) TIERED CONTENT STREAMING

(71) Applicant: OpenTV, Inc., San Francisco, CA (US)

(72) Inventors: Claes Georg Andersson, Berkeley, CA (US); Nicholas Daniel Doerring, San Francisco, CA (US); Nicholas Fishwick, San Francisco, CA (US); John Michael Teixeira, Oakland, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/213,526

(22) Filed: Mar. 26, 2021

(65) Prior Publication Data

US 2021/0281623 A1    Sep. 9, 2021

Related U.S. Application Data

(63) Continuation of application No. 16/366,701, filed on Mar. 27, 2019, now Pat. No. 10,992,721, which is a (Continued)

(51) Int. Cl.
*H04L 65/613* (2022.01)
*H04L 65/612* (2022.01)
(Continued)

(52) U.S. Cl.
CPC ......... *H04L 65/612* (2022.05); *H04L 65/613* (2022.05); *H04L 65/762* (2022.05); *H04L 65/80* (2013.01)

(58) Field of Classification Search
CPC ............ H04L 65/4084; H04L 65/4092; H04L 65/602; H04L 65/80
See application file for complete search history.

(56) References Cited

U.S. PATENT DOCUMENTS 5,969,764 A    10/1999  Sun
6,072,989 A     6/2000  Witters
(Continued)

FOREIGN PATENT DOCUMENTS

EP          2566172 A1    3/2013
WO    WO 2013030096 A1    3/2013

OTHER PUBLICATIONS

AT&T, "Adaptive Bitrate Streaming", 2020 (Year: 2020).
(Continued)

*Primary Examiner* — Oanh Duong
(74) *Attorney, Agent, or Firm* — Polsinelli LLP

(57) ABSTRACT

Techniques for providing live content at different quality levels to a user device include advertising content availability at multiple quality levels for selection by the user device, receiving a quality level selection from the user device, wherein the quality level selection matches one of the advertised multiple quality levels, determining whether the received quality level selection differs from a currently used quality level, when it is determined that the received quality level selection is different from the currently used quality level, reconfiguring a transcoder to transcode the live content to only the received quality level, and updating a metafile to include a first quality level at a first bitrate lower than a bitrate for the received quality level selection and a second quality level at a second bitrate higher than the bitrate for the received quality level selection.

15 Claims, 9 Drawing Sheets

Related U.S. Application Data continuation of application No. 15/254,829, filed on Sep. 1, 2016, now abandoned, which is a continuation of application No. 13/863,367, filed on Apr. 15, 2013, now Pat. No. 9,438,652.

(51) Int. Cl.
  *H04L 65/75* (2022.01)
  *H04L 65/80* (2022.01)

(56) References Cited

U.S. PATENT DOCUMENTS

| | | | |
|---|---|---|---|
| 6,084,857 | A | 7/2000 | Takamichi |
| 6,175,568 | B1 | 1/2001 | Awdeh |
| 6,178,159 | B1 | 1/2001 | He |
| 6,182,030 | B1 | 1/2001 | Hagen |
| 6,331,970 | B1 | 12/2001 | Nieh |
| 6,466,545 | B1 | 10/2002 | Watanabe |
| 6,882,624 | B1 | 4/2005 | Ma |
| 7,031,884 | B1 | 4/2006 | Radulovic |
| 7,660,581 | B2 | 2/2010 | Ramer |
| 8,510,848 | B1 | 8/2013 | Zhao |
| 8,532,171 | B1 | 9/2013 | Narayanan |
| 8,560,629 | B1 | 10/2013 | Bhatti |
| 8,588,296 | B2 | 11/2013 | Yang |
| 8,732,786 | B2 | 5/2014 | Drang |
| 8,964,977 | B2 | 2/2015 | Ziskind et al. |
| 9,438,652 | B2 | 9/2016 | Andersson et al. |
| 9,510,033 | B1 | 11/2016 | Corley |
| 9,788,053 | B2 | 10/2017 | Phillips |
| 10,148,716 | B1* | 12/2018 | Joseph .............. H04L 65/60 |
| 10,992,721 | B2 | 4/2021 | Andersson et al. |
| 2002/0147834 | A1 | 10/2002 | Liou |
| 2002/0163887 | A1 | 11/2002 | Suni |
| 2003/0012138 | A1 | 1/2003 | Abdelilah |
| 2003/0177503 | A1 | 9/2003 | Sull |
| 2006/0159169 | A1 | 7/2006 | Hui |
| 2006/0174304 | A1 | 8/2006 | Kim |
| 2006/0176828 | A1 | 8/2006 | Vasseur |
| 2007/0183453 | A1 | 8/2007 | Kim |
| 2007/0204067 | A1 | 8/2007 | Walker |
| 2008/0010660 | A1 | 1/2008 | Sumiyoshi |
| 2008/0215704 | A1 | 9/2008 | Curcio |
| 2008/0279286 | A1 | 11/2008 | Kobayashi |
| 2009/0041155 | A1 | 2/2009 | Sugai |
| 2009/0161568 | A1 | 6/2009 | Kastner |
| 2009/0313676 | A1 | 12/2009 | Takeshima |
| 2011/0016123 | A1 | 1/2011 | Pandey |
| 2011/0023080 | A1 | 1/2011 | Drang |
| 2011/0082946 | A1 | 4/2011 | Gopalakrishnan |
| 2011/0096673 | A1 | 4/2011 | Stevenson |
| 2011/0142125 | A1 | 6/2011 | Tripathi |
| 2012/0084454 | A1 | 4/2012 | Lindquist |
| 2012/0124179 | A1 | 5/2012 | Cappio |
| 2012/0169828 | A1 | 7/2012 | Lee |
| 2012/0223253 | A1 | 9/2012 | Papadopoulos |
| 2012/0259946 | A1 | 10/2012 | Stockhammer |
| 2012/0265901 | A1 | 10/2012 | Swenson |
| 2012/0290644 | A1 | 11/2012 | Gabin |
| 2012/0314718 | A1 | 12/2012 | Strasman |
| 2013/0003993 | A1 | 1/2013 | Michalski et al. |
| 2013/0027608 | A1 | 1/2013 | Belisomi |
| 2013/0046857 | A1 | 2/2013 | Howe |
| 2013/0064306 | A1 | 3/2013 | Mamidwar |
| 2013/0165084 | A1 | 6/2013 | Xu |
| 2013/0195204 | A1 | 8/2013 | Reznik |
| 2013/0212440 | A1 | 8/2013 | Rom |
| 2013/0254611 | A1 | 9/2013 | Amerga |
| 2013/0282877 | A1 | 10/2013 | Keum |
| 2013/0297743 | A1 | 11/2013 | Eschet |
| 2013/0301481 | A1 | 11/2013 | Inoue |
| 2013/0304934 | A1 | 11/2013 | Joch |
| 2013/0332559 | A1 | 12/2013 | Mas Ivars |
| 2013/0347033 | A1 | 12/2013 | Grab |
| 2014/0026052 | A1 | 1/2014 | Thorwirth et al. |
| 2014/0036993 | A1 | 2/2014 | Bae |
| 2014/0040496 | A1 | 2/2014 | Moorthy et al. |
| 2014/0068690 | A1 | 3/2014 | Luthra |
| 2014/0074988 | A1 | 3/2014 | Parekh |
| 2014/0130115 | A1* | 5/2014 | Losev ............... H04L 65/4084 725/116 |
| 2014/0149557 | A1* | 5/2014 | Lohmar ............. H04L 65/60 709/219 |
| 2014/0208374 | A1 | 7/2014 | Delaunay |
| 2014/0258463 | A1 | 9/2014 | Winterrowd et al. |
| 2014/0270699 | A1 | 9/2014 | Casey |
| 2014/0280746 | A1 | 9/2014 | Johns |
| 2014/0281002 | A1 | 9/2014 | Sun |
| 2014/0282765 | A1 | 9/2014 | Casey |
| 2014/0304377 | A1* | 10/2014 | Andersson ......... H04L 65/608 709/219 |
| 2014/0310424 | A1 | 10/2014 | Andersson |
| 2014/0317234 | A1* | 10/2014 | Mueller ............. H04L 67/02 709/217 |
| 2014/0344468 | A1 | 11/2014 | Saremi |
| 2015/0026711 | A1 | 1/2015 | Andersson |
| 2015/0085660 | A1 | 3/2015 | Harris |
| 2015/0156243 | A1* | 6/2015 | Skog ................. H04W 72/044 709/219 |
| 2015/0341411 | A1 | 11/2015 | Huber |
| 2016/0057192 | A1 | 2/2016 | Delaunay |
| 2017/0054775 | A1 | 2/2017 | Andersson et al. |

OTHER PUBLICATIONS

Bit Movin, "Adaptive streaming", 2020 (Year: 2020).
Liu et al., "Segment Duration for Rate Adaptation of Adaptive HTTP Streaming", 2011 (Year: 2011).
Lohmar et al., "Dynamic Adaptive HTTP Streaming of Live Content", 2011 (Year: 2011).
PureLoad Software Group, "Introduction to Adaptive HTTP Streaming and Load Testing", 2016 (Year: 2016).
Riiser et al., "Video Streaming Using a Location-Based Bandwidth-Lookup Service for Bitrate Planning", 2012 (Year: 2012).
Ruether, "Changing Default Segment Size to Decrease Streaming Latency", 2019 (Year: 2019).
Stockhammer, "Dynamic Adaptive Streaming over HTTP: Standards and Design Principles", 2011 (Year: 2011).
Thang et al., "Video Streaming over HTTP with Dynamic Resource Prediction", 2012 (Year: 2012).
Wikipedia, "Variable bitrate", 2020 (Year: 2020).
Camarillo et al., "Transcoding Services Invocation in the Session Initiation Protocol (SIP) Using Third Party Call Control (3pcc)", RFC 4117, 2005 (Year: 2005).
Heinanen et al., "Assured Forwarding PHB Group", RFC 2597, 1999 (Year: 1999).
Grossman, "New Terminology and Clarifications for Diffserv", RFC 3260, 2002 (Year: 2002).
Knowlton, "Bit Rate Throttling Configuration Walkthrough", 2007 (Year: 2007).
Muller et al., "An Evaluation of Dynamic Adaptive Streaming over HTTP in Vehicular Environments", 2012 (Year: 2012).
Nelson, "Explorign Bit Rate Changes", 2009 (Year: 2009).
Oracle I, "ACLI Configuration Guide", copyright 2013 (Year: 2013).
Spiteri et al., "From Theory to Practice: Improving Bitrate Adaptation in the DASH Reference Player", 2018 (Year: 2018).
Wikipedia, "Adaptive bitrate streaming", 2020 (Year: 2020).
Wikipedia, "Dynamic Adaptive Streaming over HTTP", 2020 (Year: 2020).
Wikipedia, under DASH over HTTP, "Self-learning clients", 2020 (Year: 2020).
Wikipedia, under DASH over http, "MPEG-DASH" 2020 (Year: 2020).
Zambelli, "Smoothing Streaming Technical Overview", 2009 (Year: 2009).
Hernandez-Valencia et al., "Rate control algorithm for the ATM ABR service", 1997 (Year: 1997).

(56) References Cited

OTHER PUBLICATIONS

ITU-T, "Traffic control and congestion control in B-ISDN", 2004 (Year: 2004).
Microsoft Computer Dictionary, "volatile memory", 5th edition, 2002.
Merriam-Webster "volatile", 2018.
Non-Final Office Action dated May 21, 2015 for U.S. Appl. No. 13/863,367; 18 pages.
Final Office Action dated Oct. 19, 2015 for U.S. Appl. No. 13/863,367; 20 pages.
Notice of Allowance dated May 5, 2016 for U.S. Appl. No. 13/863,367; 15 pages.
Non-Final Office Action dated May 9, 2018 for U.S. Appl. No. 15/254,829; 24 pages.
Notice of Allowance dated Dec. 28, 2018 for U.S. Appl. No. 15/254,829; 24 pages.
Non-Final Office Action dated Apr. 3, 2020 for U.S. Appl. No. 16/366,701; 22 pages.
Notice of Allowance dated Dec. 30, 2020 for U.S. Appl. No. 16/366,701; 48 pages.

\* cited by examiner

```
#file identifier
#entry 1
#parameters 1
#entry 2
#parameters 2
    :   :   :
#endfile
```

TIERED CONTENT STREAMING

CROSS-REFERENCE TO RELATED APPLICATIONS

This application is a continuation of U.S. patent application Ser. No. 16/366,701, filed on Mar. 27, 2019 which is a continuation of U.S. patent application Ser. No. 15/254,829, filed on Sep. 1, 2016 which is a continuation of U.S. patent application Ser. No. 13/863,367 filed on Apr. 15, 2013. The subject matter of all of the foregoing patent applications is incorporated herein by reference in its entirety, for all purposes.

TECHNICAL FIELD

The present disclosure relates to the field of content delivery.

BACKGROUND

New television technologies such as personal video recorders (PVRs) make it possible for a user to watch time-shifted video on a TV by recording a program at one time and watching the program at a later time. Different from time-shifted programming, live programming is a program that is watched by a user while it is being transmitted over the content network (e.g., cable, satellite, fiber optic, IPTV, etc.). Live programming remains to be in demand by consumers.

The availability of secondary devices such as tablet (or pad) computers and smartphones that are capable of receiving and displaying content have changed at least some users' viewing habits: certain users now wish to watch live, or recorded, programming on a secondary device.

SUMMARY

Improvements to techniques for providing content to secondary devices are desirable to meet the increasing demand by consumers to watch contents on secondary devices. This patent document discloses techniques for providing live content from a primary device to a secondary device over a network connection. In some embodiments, the primary device makes available live content at different quality tiers, or bitrates, selectable by the secondary device, without the primary device having pre-coded version of the content at the different quality tiers and without the primary device having multiple transcoders operating to generate bitstreams at the multiple quality tiers. In some embodiments, the list of selectable bitrates is controlled to reduce operational issues such as degradation in video quality due to bitrate changes.

In one aspect, a method, an apparatus and a computer program product storing code for providing live content at different quality levels to a remote user device include techniques for advertising content availability at multiple quality levels in a metafile for selection by the remote user device, receiving a quality level selection from the remote user device, wherein the quality level selection matches one of the multiple quality levels in the metafile, determining whether the received quality level selection differs from a currently used quality level for the remote user device, when it is determined that the received quality level selection is different from the currently used quality level, reconfiguring a transcoder to transcode the live content to only the received quality level and updating the metafile to include a first quality level at a first bitrate lower than a bitrate for the received quality level selection and a second quality level at a second bitrate higher than the bitrate for the received quality level selection.

In another aspect, a computer program product comprising a computer-readable medium having code stored thereon is disclosed. The code, when executed, causes a processor to implement a method of streaming live content including controlling a transcoder to receive live content and output transcoded live content at a current quality level, wherein the current quality level is selected based on a content playback request from a user device, storing transcoded live content at a local memory as individually addressable segments, wherein each segment has a playback duration, and transmitting a message to the user device indicating that the live content is available at least at the current quality level and at least two additional quality levels, without having any locally stored content segments corresponding to the at least two additional quality levels.

These and other aspects and their implementations are described in greater detail in the drawings, the description and the claims.

BRIEF DESCRIPTION OF DRAWINGS

Embodiments described herein are illustrated by way of example and not limitation in the figures of the accompanying drawings, in which like reference numbers indicate similar elements and in which:

FIG. 3 shows an example metafile listing.

DETAILED DESCRIPTION

Figure 1:
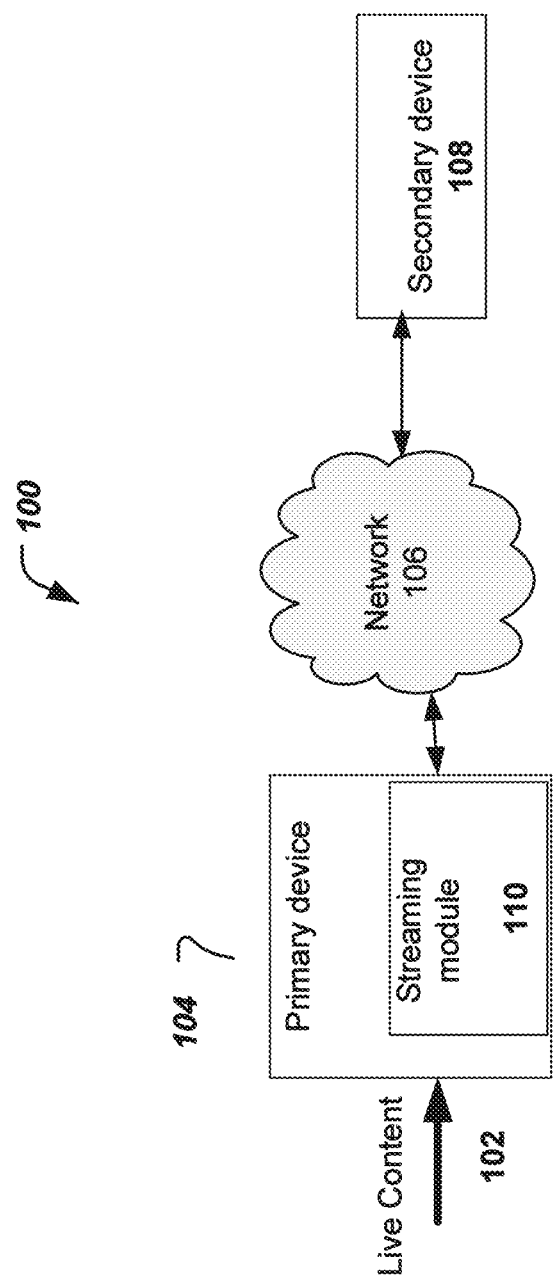
FIG. 1 is diagrammatic representations of a local content delivery network.

Live programming such as live audio or video programming may be in various forms. For example, the live programming may be a breaking news story, or a sports event or an audio or video program being broadcast over a communication network. Some users may wish to view or listen to the live program on a secondary device that is not in direct communication with the network from which the live programming is being received. For example, a primary device may be receiving the live programming (e.g., a cable or a satellite set-top box) and the user may wish to view the live content on a secondary device such as a smartphone, a tablet a laptop or another wireless device.

To make the live content available to a secondary device, the primary device may transmit the live content wirelessly to the secondary device, using unlicensed spectrum such as the industrial, scientific and medical (ISM) band used by 802.11 (Wi-Fi) devices. To take into account time variations in the available wireless bandwidth, the primary device may make the live content available to the secondary device at multiple different quality tiers (e.g., different encoding bitrates).

Several well-known industry techniques such as the hypertext transfer protocol (HTTP) live streaming protocol (HLS) from Apple or similar streaming techniques from Microsoft, Google, Adobe, etc. provide for transmission of content (sometimes called streaming). A receiving device can transfer an encoded content segment by selecting a quality level suitable to currently available network bandwidth or resource availability (buffer and processor power) at the receiving device.

To comply with the industry standard streaming techniques, primary devices often make multiple copies of the same content available at multiple quality levels so that the receiving device can select which quality level to receive at a given time. The multiple quality copies may be precomputed and stored on a local storage device, thereby requiring a large amount of storage space. For live content, pre-recording of multiple qualities may not be possible because the pre-recording may result in excessive latency. Primary devices thus often use multiple transcoders, each transcoder configured to generate encoded live content at a given bitrate. However, the use of large storage capacity and/or multiple transcoders makes conventional solutions expensive for streaming live content to secondary devices.

The techniques disclosed herein can be used to overcome the above-discussed operational limitations, and others. In one example aspect, a primary device that comprises only a single transcoder per output stream is disclosed. In spite of being able to transcode one video stream at a given time, the primary device advertises availability of live content at various bit rates. Based on a request received from a secondary device, the primary device controls the output bitrate of the transcoder to provide the desired bitrate output to a user. In another aspect, a primary controls the advertised bitrates available to the secondary device so that the secondary device is constrained to how fast it can change the streaming bitrate. These, and other, aspects are further described in greater detail below.

It should be noted that higher bitrates often (but not always) result in better visual quality of the compressed video. While the terms "quality" and "bitrate" are interchangeably used in the present document for clarity, in general, higher quality may be achieved without necessarily having to change bitrates and no assumptions are made by subject technology about a specific relationship between a quality tier and the corresponding bitrate. Furthermore, the encoding bitrate of a content segment is indicative of the amount of data in the content segment (e.g., a 10 second video segment encoded at 8 Mbps may be double in size of that of a 10 second video segment encoded at 4 Mbps). However, the actual transmission rate at which the content is transmitted over a network (e.g., using HTTP) may in general be different from the video encoding bitrate. In some embodiments, the secondary device may request a lower quality (lower bitrate) video when the transmission bandwidth of a channel reduces, typically to reduce the amount of time taken to transfer the video segment over the network.

Examples of System Architectures

With reference to FIG. 1, a system 100 includes a primary device 104, that includes a streaming server module 110 receives live content 102. In various embodiments, the primary device is a digital or analog cable set-top box, a satellite receiver, a home gateway device, an over-the-top box, a computer, a smartphone, etc. Correspondingly, the live content 102 may be received over a digital cable interface, an analog cable interface, a satellite signal, a broadband internet connection, a wide area cellular connection (e.g., 3G or 4G long term evolution or LTE, WiMax, etc.) and so on. The primary user device 104 may be communicatively coupled with a secondary user device 108 over an in-home network 106. The term "in-home" is used for simplicity and the network 106 may be wired or wireless and be deployed in a user residence or a commercial or a public place (e.g., airport, restaurant) and may be indoor or outdoor. Some examples of the in-home network 106 include 802.11x (Wi-Fi), Bluetooth, Wireless Universal Serial Bus (USB), and so on.

Figure 2:
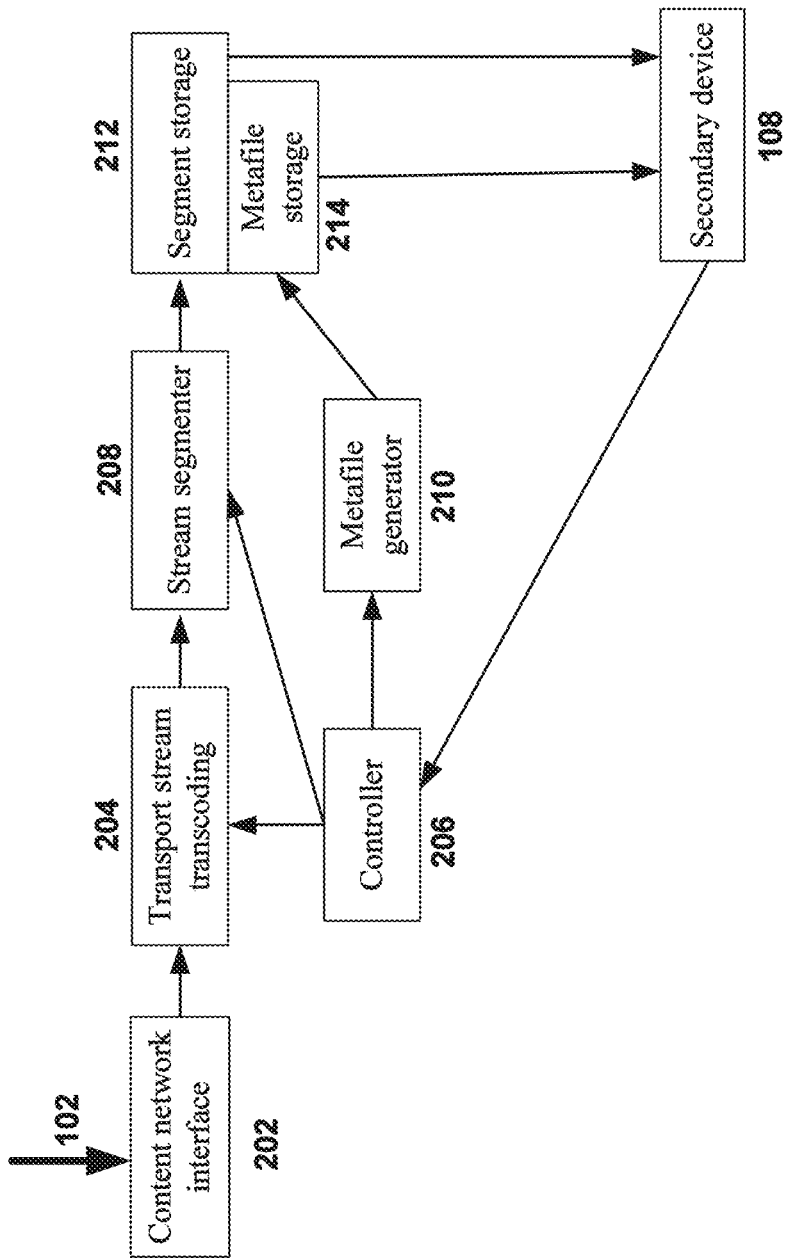
FIG. 2 is diagrammatic representations of an adaptive bitrate transcoding system

FIG. 2 depicts some functional modules in the system 100. The modules 202, 204, 206, 208 and 210 may be implemented internal to a primary user device 104. The modules 212 and 214 may be implemented internal to or external to the primary user device 104. For example, in some embodiments, the storage may be on an internal hard drive, while in other embodiments, an external storage device such as a hard drive or a flash drive may be used.

The content network interface module 202 receives live content 102 over a content network, such as the above discussed cable, satellite, internet or cellular network. In some embodiments, the content network interface module 202 may interface with a local storage device (e.g., PVR storage) over a bus internal to the primary device.

The transport stream (TS) transcoding module 204 receives a live content as a transport stream (or a program stream, or another suitable format). The TS transcoding module also receives transcoding parameters from a controller module 206. The transcoding parameters may include parameters that control the start time of transcoding, the end time of transcoding, transcoding duration, a target bitrate used for transcoding, a type of transcoding used (e.g., filtering, whether or not to decode motion vectors, etc.).

The stream segmenter module 208 operates under the control of controller 206 to generate time slices or segments of transcoded bitstream output. The stream segmenter module 208 may receive information from the transcoding module 204 about when the bitrate was changed so that the stream segmenter module 208 is able to generate segments at the exact boundaries at which the bitrate was changed. The duration of the segments may typically be chosen to meet conflicting goals of quick changes to bitrates and higher per-segment quality. The shorter duration segments (e.g., 2 seconds or below) allow for fast changes to bitrates of the stream sent to the secondary user device 108 (because bitrate can be changed on segment boundaries) but may come with the penalty of sub-optimal video quality of transcoded video because transcoding technique often benefit from long term statistical trend in videos to improve compression efficiency. Longer segments (e.g., 10 seconds or more) may mean improved transcoding compression quality, but may produce unacceptable delays in live content and also reduce agile responding to varying channel conditions in the network 106. The controller 206 may implement a segment length optimization module as discussed throughout this document.

The controller 206 may also control a metafile generator module 210 to generate a metafile that is downloaded to the secondary user device 108. The segment storage module 212 may store the segments generated at the output of the stream segmenter module 208. The metafile storage module 214 may store at least the most recent metafile that is made available to or is pushed to the secondary device 108.

Examples of Metafiles

FIG. 3 depicts an example listing of a metafile 300 generated by the metafile generator module 210 and stored in the metafile storage module 214. In some embodiments, the metafile 300 may comprise a file in the m3u8 format, as specified by Apple's HLS specification. The metafile 300 may be identified using a file identifier. The metafile 300 may list available content segments as a list having entries entry 1, entry 2 etc. and corresponding parameters associated with each entry (e.g., segment bitrate, segment duration and a link such as a uniform resource locator to where the segment is stored on the storage device).

In some embodiments, e.g., using the m3u8 format of adaptive HLS, two different types or tiers of metafiles may be used. A master metafile (e.g., a master m3u8 file) may list all other m3u8 files corresponding to various quality levels (e.g., bitrates). Often, the primary device 104 and the secondary device 108 may be configured to implement an industry standard streaming protocol such as Apple's HLS protocol, in which the primary device 104 typically cannot control several operational aspects of the secondary device 108 (e.g., how often the secondary device 108 can request bitrate changes, as further discussed below).

Figure 4:
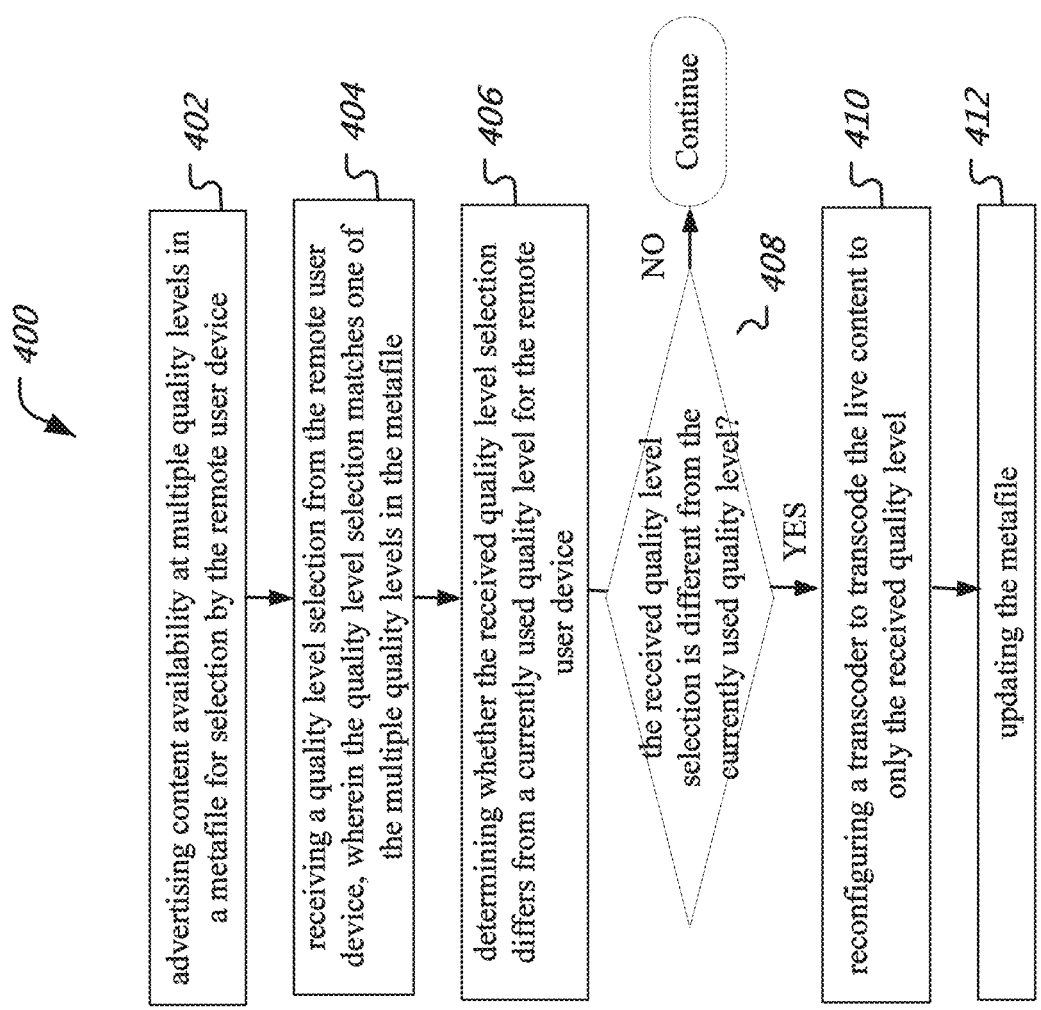
FIG. 4 is a flowchart representation of a process of providing content in a local area network.

FIG. 4 is a flowchart representation of a process 400 of providing live content at different quality levels to a remote user device such as a secondary device 108.

At 402, the process 400 advertises content availability at multiple quality levels in a metafile for selection by the remote user device. In some embodiments, the listing of quality levels may be a subset of all possible quality levels in which the transcoder can be operated. For example, a primary device 104 may be capable of producing transcoder output at ten different quality levels—e.g., Q0 to Q9. However, the process 400 may advertise only three quality levels, e.g., Q4, Q5 and Q6, in the metafile initially made available to the secondary device 108. Some advantageous aspects of listing only a smaller subset of all possible output quality levels is further disclosed below. In some implementation, a program guide interface at the secondary device may indicate the availability of the live content to the user. However, the detail of quality tiers and bitrates may be hidden from the user and dealt with by implementation stack at the secondary device.

At 404, the process 400 receives a quality level selection from the remote user device, wherein the quality level selection matches one of the multiple quality levels in the metafile. The quality level selection may be indicated, e.g., by the URL in the request from the remote user device and the video bitrate associated with the URL.

At 406, the process 400 determines whether the received quality level selection differs from a currently used quality level for the remote user device.

At 408, when it is determined that the received quality level selection is different from the currently used quality level, the process 400 reconfigures, at 410, a transcoder to transcode the live content to only the received quality level. In some embodiments, the transcoder module 204 may be re-programmed to output content at the quality level indicated in the received request. In some embodiments, the process 400 may wait for a transcoder reaction time period before changing the transcoder output bitrate, e.g., to alleviate a bitrate thrashing operational problem that is further discussed below.

At 412 the process 400 updates the metafile to include a first quality level at a first bitrate lower than a bitrate for the received quality level selection and a second quality level at a second bitrate higher than the bitrate for the received quality level selection. In some embodiments, the master metafile may list metafiles corresponding to bitrates or quality levels that actually do not exist on the primary device. In some embodiments, the process 400 may wait for a predetermined duration before updating and transmitting the updated metafile, e.g., to alleviate a bitrate thrashing operational problem that is further discussed below. Some advantageous aspects of the above-discussed three-quality level metafile are further in this document.

Figure 5:
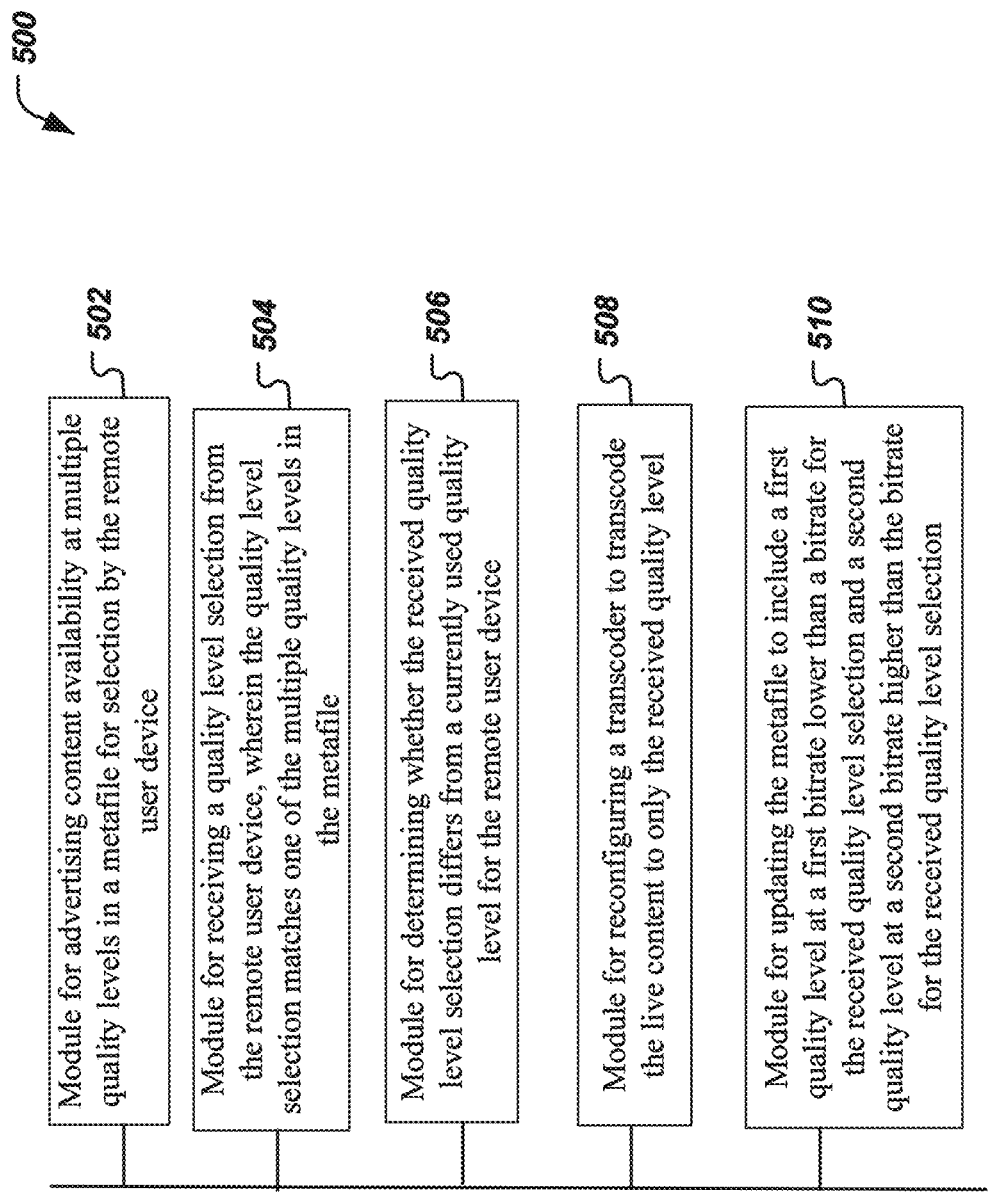
FIG. 5 is a block diagram representation of an apparatus for content streaming.

FIG. 5 is a block diagram representation of an apparatus 500 for providing live content for viewing. The module 502 is for advertising content availability at multiple quality levels in a metafile for selection by the remote user device. The module 504 is for receiving a quality level selection from the remote user device, wherein the quality level selection matches one of the multiple quality levels in the metafile. The module 506 is for determining whether the received quality level selection differs from a currently used quality level for the remote user device. The module 508 is for, reconfiguring a transcoder to transcode the live content to only the received quality level. The module 510 is for updating the metafile to include a first quality level at a first bitrate lower than a bitrate for the received quality level selection and a second quality level at a second bitrate higher than the bitrate for the received quality level selection.

Examples of Time Variability

In some embodiments, the secondary device 108 may detect channel conditions and suitably request that the bitrate of the live content being received over the in-home network be reduced or increased. In some embodiments, the ISM band may be shared with other devices, such as cordless phones and a local wireless internet network. Radio frequency interference may occur due to the use of these devices or other devices such as microwave ovens. For example, when a cordless phone rings, the channel quality for live content transmission may immediately suffer in a short time span (<1 second). Changes in the transmission channel may trigger changes to the quality or bitrate of the video requested by the secondary device 108.

As an illustrative example, at time T0 a video program may have a current transfer rate of 8 Mbps, with other rates being advertised in the metafile including: 7.5, 6, 6.5, 5, 4, 3 and 2 Mbps. At time T0, the secondary device 108 may notice an operating condition (degraded channel or buffer running low) that may cause the secondary device 108 to request a lower bitrate. For example, when channel degradation is severe, the secondary device 108 may request that 2 Mbps be used for next transmission after time TO.

From the primary device's perspective (e.g., for the streaming server module 110), this quality change request may have a few operational implications. For example, the primary device may control the transcoder module to change the output bitrate from 8 Mbps to 2 Mbps. However, in some embodiments, the bitrate change may be greater than a step size threshold by which a transcoder's output rate can be changed. Some commercially available transcoder produce visually substantially artifact-free only when the changes to transcoding rate are below a threshold such as 0.5 Mbps. Furthermore, even if the primary device were to change the transcoder output rate at time TO to the value desired by the secondary device (e.g., 2 Mbps in this example), the secondary device may not receive content Ts*Ns seconds later, where Ts is the time duration of segments previously outputted by the transcoder and stored in the segment storage 212, and Ns is the number of these segments that are buffered prior to transmission. This buffering may occur either at the primary device and/or the secondary device. For example, at T0, the transcoder may already have outputted two segments of duration 2 seconds (or 10 seconds in an HLS implementation) each, thus the secondary device will begin to receive 2 Mbps quality video 4 seconds (or 20 seconds) after time T0 at which it makes a request for a lower quality video.

In some embodiments, the time instances at which the secondary device requests changes to quality of streamed video and how often the secondary device requests these changes may not be directly controllable by the primary device that is transcoding and sending out the video segments. The primary device's own transcoding operation may be limited by the rate at which the transcoder output rate can be changed without causing unacceptable quality degradation to output video. The bitrate changing speed of the primary device's transcoding operation may also be limited by the amount of buffering performed, as a number segments. The buffering may represent the time difference between when a transcoded output is generated and when the transcoded output is decoded and presented as moving pictures to a user.

In some embodiments, to bring synchronicity between how fast the secondary device can request reception of video segments at different bitrates and how fast the primary device can re-program its transcoder, the primary device may control the rate at which the secondary device receives changes in the bitrate or the streamed content. The primary device may accomplish the control over the rate of change of quality (slew rate) using a metafile based technique, or a priori rules based technique or an explicit messaging technique, or a combination of some or all of these techniques.

Using the metafile-based control technique, the primary device may control the number of entries in the metafile, listing different quality levels. For example, when a current transfer rate is 6 Mbps, the primary device may list only a finite number of additional bitrates or quality levels at which the content is available (e.g., 5.5 Mbps and 6.5 Mbps). Thus, the secondary device, regardless of how often it requests quality changes, is constrained to request bitrate changes that differ by a quantity that is controlled by the primary device (0.5 Mbps, in the above example). In some embodiments, this quantum of change may be equal to or related to a transcoder's bitrate change step size. Using this technique, in some embodiments, the fastest changes to video quality that a secondary can achieve is 0.5 Mbps per Ns*Ts seconds. Obviously, the primary device has degrees of freedom to select the values for differences in advertised bitrates from a given current rate, whether these bitrates are less than or greater than the advertised bitrates, values of Ns and Ts, and so on.

As an illustrative example, in one embodiment, due to a severe disturbance, the secondary device may request that the quality rate be changed from 6 Mbps to 2 Mbps. Uncontrolled by the primary device, the secondary device may send this request every 500 milliseconds. However, the primary device may be configured to change bitrates only in steps less than 1 Mbps at a time. Therefore, it may take the primary device 4 attempts (6 to 5, 5 to 4, 4 to 3, and 3 to 2 Mbps) before the primary device can lower the rate to the secondary devices desired level. In addition, for the visual continuity of content, the primary device may produce at least one segment of video (say, 2 seconds duration) for each lower bitrate. Therefore, it would be 8 seconds before the secondary device starts receiving video at the desired 2 Mbps rate. In the meantime, the secondary device may have made up to 16 requests (8 seconds/500 milliseconds) to the primary device, requesting to reduce the bitrate to 2 Mbps.

While these rate reductions are queued in the primary device, the disturbance that degraded the channel quality may have ended and now the secondary device may wish to raise the quality from 2 Mbps back to 6 Mbps. However, a 6 Mbps request from the secondary device may be queued up behind the 16 rate reduction requests at the primary device. It can thus be seen that, without additional techniques, such a feedback/request system may result in an unsatisfactory experience for the user.

In some embodiments, using a metafile based technique, at any time, the primary device may constrain the bitrates that the secondary device can request. For example, in the example described above, when a disturbance occurs at 6 Mbps time, then the secondary device may only be able to request 5.5 Mbps as the lower rate option. After passage of a time (e.g., equal to the buffering period, e.g., 2 segments×5 seconds each), the primary device may then update the metafile to indicate to the secondary device that a stream is available at 5 Mbps. If the disturbance is still persisting, then the secondary device may at this time request to lower quality to 5 Mbps.

The above-discussed constraining of bitrates selectable by the secondary device can advantageously also be used to avoid a "bitrate thrashing" problem that could occur in convention streaming techniques in which secondary devices are continuously requesting changes to the quality of video being sent to them. For example, the thrashing situation would be caused by a secondary device requesting a new bitrate, the transcoder being adjusted to the new rate, and the advertised bitrates being updated to be centered on the new rate, the secondary device continues consuming data at the old rate though but assuming that it is the new rate and may again request a change to the rate. Depending on the implementation of the secondary device, this mismatch may happen many times while the initial request is working through the various components/buffers in the primary device. This asynchronous operation of the secondary device side request generation logic and the primary device side transcoder reconfiguration logic may cause the secondary device to overshoot or undershoot the optimal quality, and when it tries again to go to the optimal quality it will again overshoot and end up at the other extreme. This could lead to a cycle of bouncing between the highest and lowest quality levels.

In some embodiments, "bitrate thrashing" where three or more quality level are advertised may produce a negative viewer experience due to continuous changes to the bitrate.

This "bitrate thrashing" situation is further illustrated below with specific bitrate and time period values for illustration only. For the illustration, assume the transcoder can handle 10 quality levels Q0-Q9 with Q0 being the poorest quality and Q9 being the highest quality. Further assume that a change in transcoder quality takes a minimum of 4 seconds to be propagated to the segmented files. Assume that a client (secondary device) changes its desired quality within 2 seconds of playtime. In present day systems, this time is dependent on client implementation and is not controlled by the server (the primary device). Assume the client will seek both higher and lower quality levels if the current level is judged as not optimal. To simplify the explanation, it is assumed that the primary device is currently transcoding at Q5 and the client's optimum quality level is Q3.

Case 1—a Hypothetical Conventional Technique

[Time: 0 s] The client requests the "Metafile" and is given all the possible transcoder qualities (Q0-Q9)—The client chooses Q5 and is delivered Q5 segments for analysis.

[Time: 2 s] The client determines Q5 is too high and requests Q4 segments—the controller informs the transcoder to switch to Q4 but Q5 segments are still being served.

[Time: 4 s] The client determines what it believes to be Q4 (actually Q5) is too high and requests Q3 segments—the controller informs the transcoder to switch to Q3 but Q5 segments are still being served.

[Time: 6 s] Transcoder produces first Q4 segment—The client determines what it believes to be Q3 (actually Q4) is too high and requests Q2 segments—the controller informs the transcoder to switch to Q2 but Q4 segments are still being served.

[Time: 8 s] Transcoder produces first Q3 segment—The client determines what it believes to be Q2 (actually Q3) are just right—client is happy (for the time being)

[Time: 10 s] Transcoder produces first Q2 segment—The client determines what it believes to be Q2 (and actually is Q2) is too low and requests Q3 segments—the controller informs the transcoder to switch to Q3 but Q2 segments are still being served.

[Time: 12 s] The client determines what it believes to be Q3 (actually Q2) is too low and requests Q4 segments—the controller informs the transcoder to switch to Q4 but Q2 segments are still being served.

[Time: 14 s] Transcoder produces first Q3 segment—The client determines what it believes to be Q4 (actually Q3) is just right—client is happy (for the time being)

[Time: 16 s] Transcoder produces first Q4 segment—The client determines what it believes to be Q4 (and actually is Q4) is high and requests Q3 segments—the controller informs the transcoder to switch to Q3 but Q4 segments are still being served.

[Time: 18 s] client determines what it believes to be Q3 (actually Q4) is too high and requests Q2 segments—the controller informs the transcoder to switch to Q2 but Q4 segments are still being served.

[Time: 20 s] Transcoder produces first Q3 segment—The client determines what it believes to be Q2 (actually Q3) is just right—client is happy (for the time being)

Go to [Time: 10 s] step—this enters an infinite loop from steps discussed between 10 seconds and 20 seconds above. This loop is called bitrate thrashing.

Case 2—Using a Disclosed Technique

[Time: 0 s] The client requests the "Metafile" and is only given Q4, Q5 and Q6 as options—The client chooses Q5 and is delivered Q5 segments for analysis.

[Time: 2s] The client determines Q5 is too high and requests Q4 segments—the controller informs the transcoder to switch to Q4 but Q5 segments are still being served.

[Time: 4s] The client determines what it believes to be Q4 (actually Q5) is too high but there is currently no other option so the client continues to try Q4

[Time: 6s] Transcoder produces first Q4 segment—the metafile is updated to advertise Q3, Q4, and Q5. This update may be delayed by the server (primary device) to give the client time to evaluate the correct segment. The client still is not satisfied with Q4 but now has a Q3 to try which it requests—the controller 206 informs the transcoder 204 to switch to Q3 but Q4 segments are still being served.

[Time: 8s] The client determines what it believes to be Q3 (actually Q4) is too high but there is currently no other option so the client continues to try Q3.

[Time: 10s] Transcoder produces first Q3 segment—the metafile is updated to advertise Q2, Q3, and Q4. This update may be delayed to give the client time to evaluate the correct segment. The client now is satisfied with Q3 since it has slowed it's optimal speed.

The primary device may use a similar technique of controlling the speed with which the secondary device can increase the desired bitrate, e.g., after a channel disturbance has disappeared. In some embodiments, the primary device may use a reaction interval to wait to change transcoder output from the time a quality change is requested (e.g., to overcome the above-discussed bitrate thrashing problem). In some embodiments, the primary device may use a mapping—e.g., averaging of a number of consecutive quality rate requests from the secondary device, to control or eliminate the thrashing problem discussed above.

In embodiments that use an a priori based rule, the secondary device may be configured to control the amount by which it changes bitrates in successive requests and also may be constrained to how often these requests are sent (e.g., once every segment duration instead of faster than the duration of a segment).

In embodiments that use an explicit message based technique, the primary device may, e.g., before the start of a streaming session, communicate the primary device's preferred parameters for how often the secondary device should request bitrate changes and the step size it should use for requesting these changes, and so on. In some embodiments, the explicit message may specify to the secondary device a duration that it should wait before it can send another quality change request of the same type as the one sent immediately before (e.g., a reaction interval time between two consecutive bitrate requests to increase, or two consecutive bitrate requests to decrease, bitrate.

Figure 6:
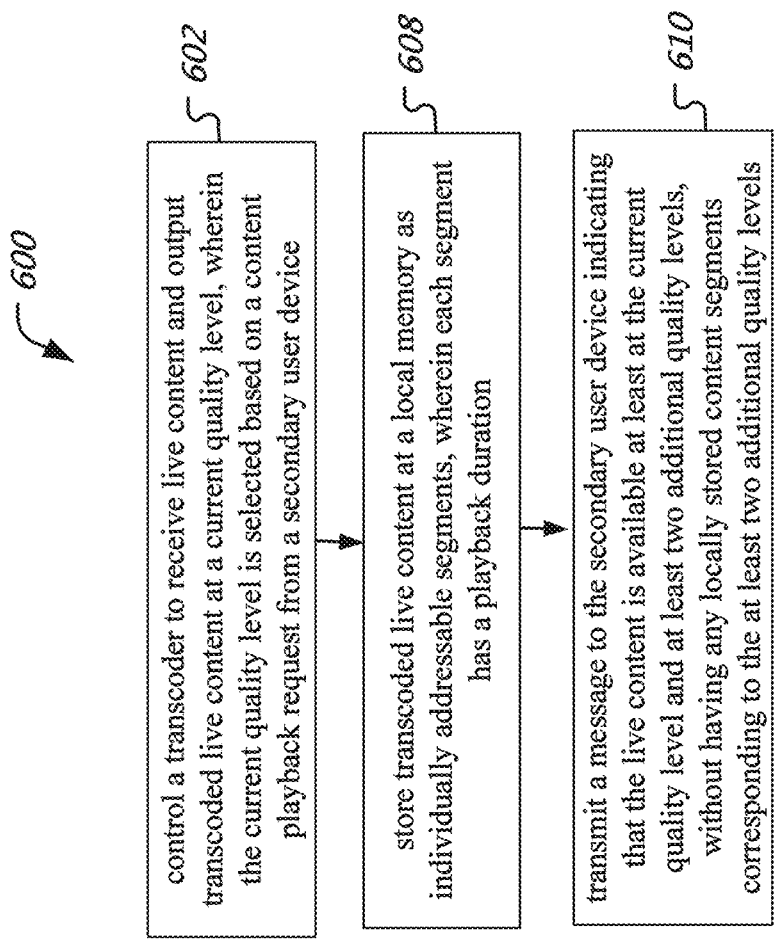
FIG. 6 is a flowchart representation of a process of transcoding live content.

FIG. 6 is a flowchart representation of a method 600 of providing streaming content from a primary user device to a secondary user device. At 602, a transcoder is controlled to receive live content and output transcoded live content at a current quality level. The current quality level is selected based on a content playback request received from a secondary user device. At 604, transcoded live content is stored at a local memory as individually addressable segments. Each segment has an associated playback duration. At 606, a message is transmitted to the secondary user device indicating that the live content is available at least at the current quality level and at least two additional quality levels. However, as disclosed herein, no content segments corresponding to the two additional quality levels are pre-stored in a storage (e.g., local memory).

In some embodiments, the method 600 may include receiving from the user device information about a maximum quality change acceptable to the user device. The method 600 may further include controlling the transcoder such that a change in the current quality levels is less than the maximum quality change acceptable to the user device. In some embodiments, the method 600 may further control the duration of the time period between when a quality change request is received to the time at which the transcoder is controlled to changes the output bitrate. In one aspect, controlling this time period may be advantageous to reduce or eliminate the bitrate thrashing problem discussed in this document.

Figure 7:
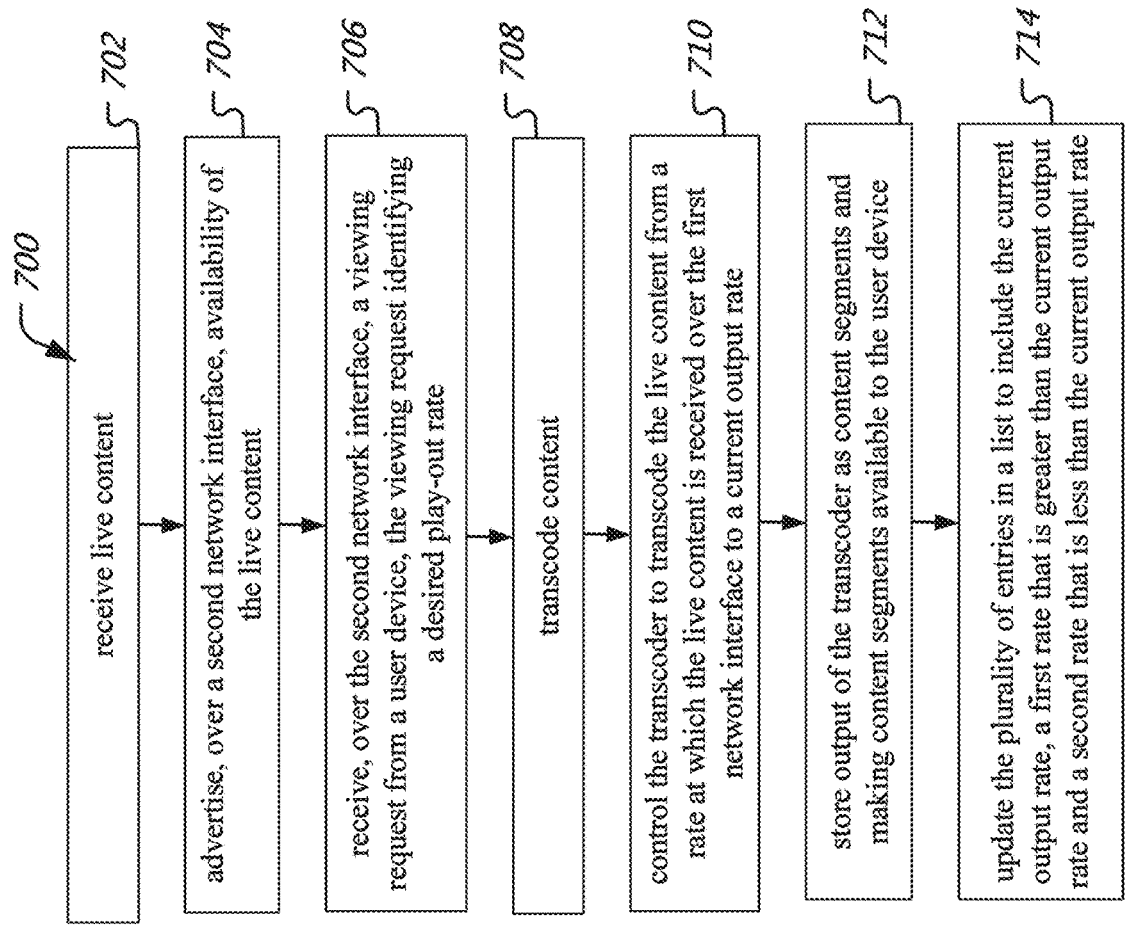
FIG. 7 is a flowchart representation of a process of transcoding live content.

FIG. 7 is a flowchart representation of a process 700 of providing live content in an in-home network. At 702, live content is received over a content network interface. At 704, availability of the content is advertised, or made available, over the second (in-home) network interface. For example, availability of live content may be indicated in a program guide displayed at a user device. At 706, a viewing request is received from the user device over the second network. The request identifies a desired play-out rate for the content. For example, a metafile 300 may uniquely associate a play-out bitrate with a URL and thus the URL request may identify the play-out rate desired by the user device. At 708, a transcoder is controlled to perform transcoding of the received live content. At 710, the live content is transcoded from a rate at which the live content is received over the content network interface to a current output rate that is substantially equal to the desired play-out rate. At 712, the output is stored as a plurality of content segments (typically 2 to 5 or more) that are made available to the user device using, e.g., a metafile listing of URLs of the content segments. At 714, the plurality of entries in the list are updated to include the current output rate, a first rate that is greater than the current output rate and a second rate that is less than the current output rate. For example, using such a description file, the user device may be able to request a higher quality stream (when channel is better) or a lower quality stream (when channel is impaired).

Figure 8:
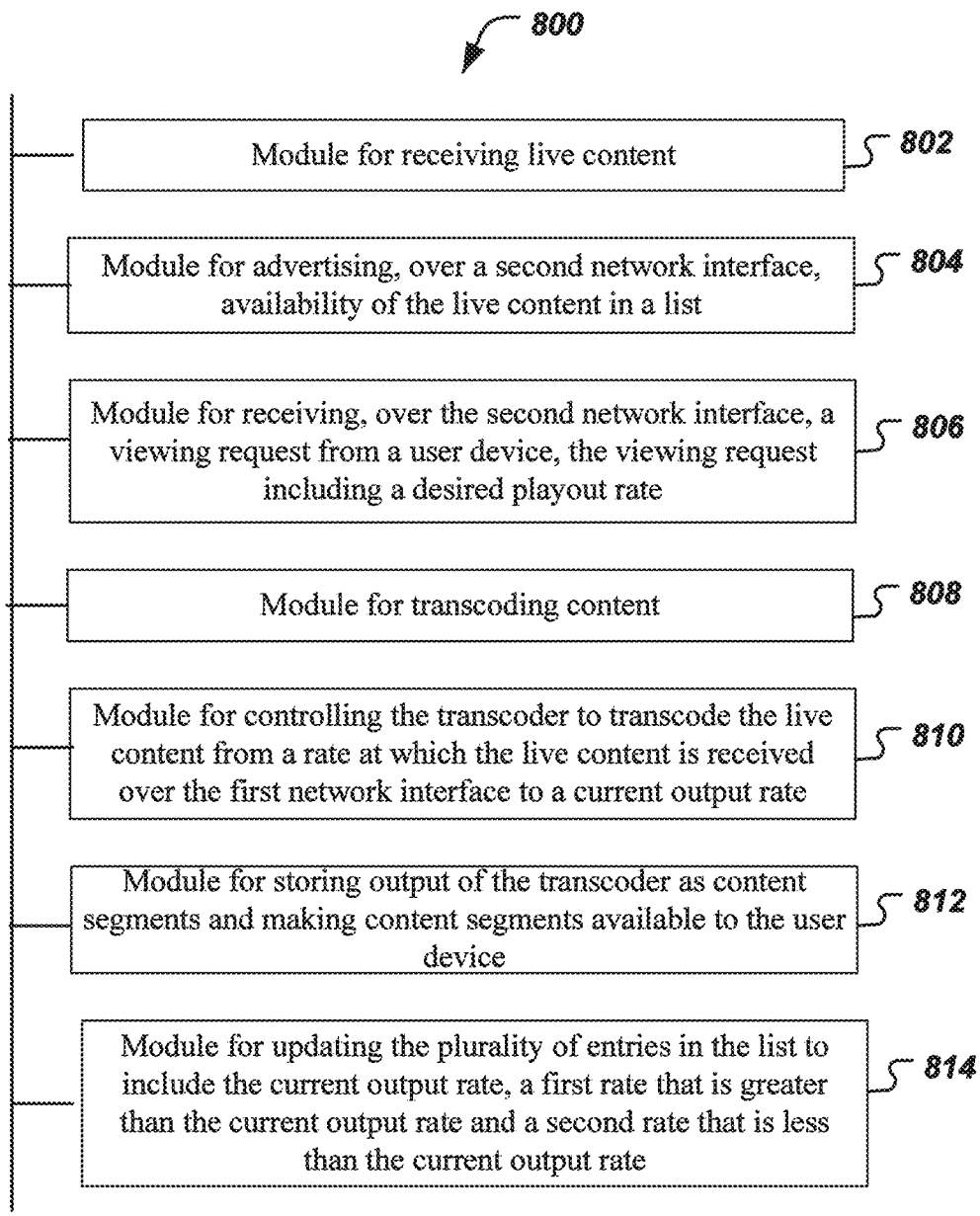
FIG. 8 is a block diagram representation of a live content transcoder apparatus.

FIG. 8 is a block diagram representation of an apparatus 800 for providing live content to a user device using a single transcoder. The module 802 is for receiving live content over a first network interface. The module 804 is for making available, over a second interface, availability of the live content in a list. The module 806 is for receiving, over the second network interface, a viewing request from a user device. The viewing request is indicative of a desired play-out rate. The module 808 is for transcoding content. The module 810 is for controlling the transcoder to transcode the live content from a rate at which the live content is received over the first network interface to a current output rate. The module 812 is for storing output of the transcoder as content segments and making content segments available to the user device. The module 814 is for updating entries in the list to include the current output bitrate, a first bitrate higher than the current output bitrate and a second bitrate lower than the current output rate.

The techniques disclosed in this document are equally applicable to streaming of pre-recorded content that is being read from a storage device, as would be case for a pre-recorded content in a digital video recorder (DVR) or a personal video recorder (PVR). In a typical PVR device, content is stored at a pre-specified bitrate. However, due to time-varying conditions in the in-home network, a transcoder may be useful to transcode the content to different rates (or qualities), as described in this document. In some embodiments, an apparatus for presenting a pre-recorded content to a user, the apparatus comprises a memory that stores program instructions, an interface over which the apparatus receives the content and associated metadata, and a processor that that reads and executes program instructions from the memory to receive, from the user, a viewing request for the content, initiate a streaming session with a server of the live content, wherein the streaming session comprises downloading the content as multiple program segments, each having an encoding bitrate, communicate a maximum bitrate change from one program segment to next that is acceptable to the apparatus and present the downloaded program segments to the user. In some implementations, an operational parameter is monitored (e.g., buffer fullness, network bandwidth, packet errors, etc.). Based on the operational parameter, a program segment is selected for next download. For example, if network bandwidth availability is higher than previous determination, then a higher quality program segment is selected for download. In some implementations, a time interval value may be received. As previously disclosed, the time interval value may be used by a secondary device to control how often it fetches program segments at different quality rates from the server. In some implementation, a feedback may be provided to the server about the available network bandwidth. This feedback may be used by the server to change transcoding rate of the live transcoder.

Figure 9:
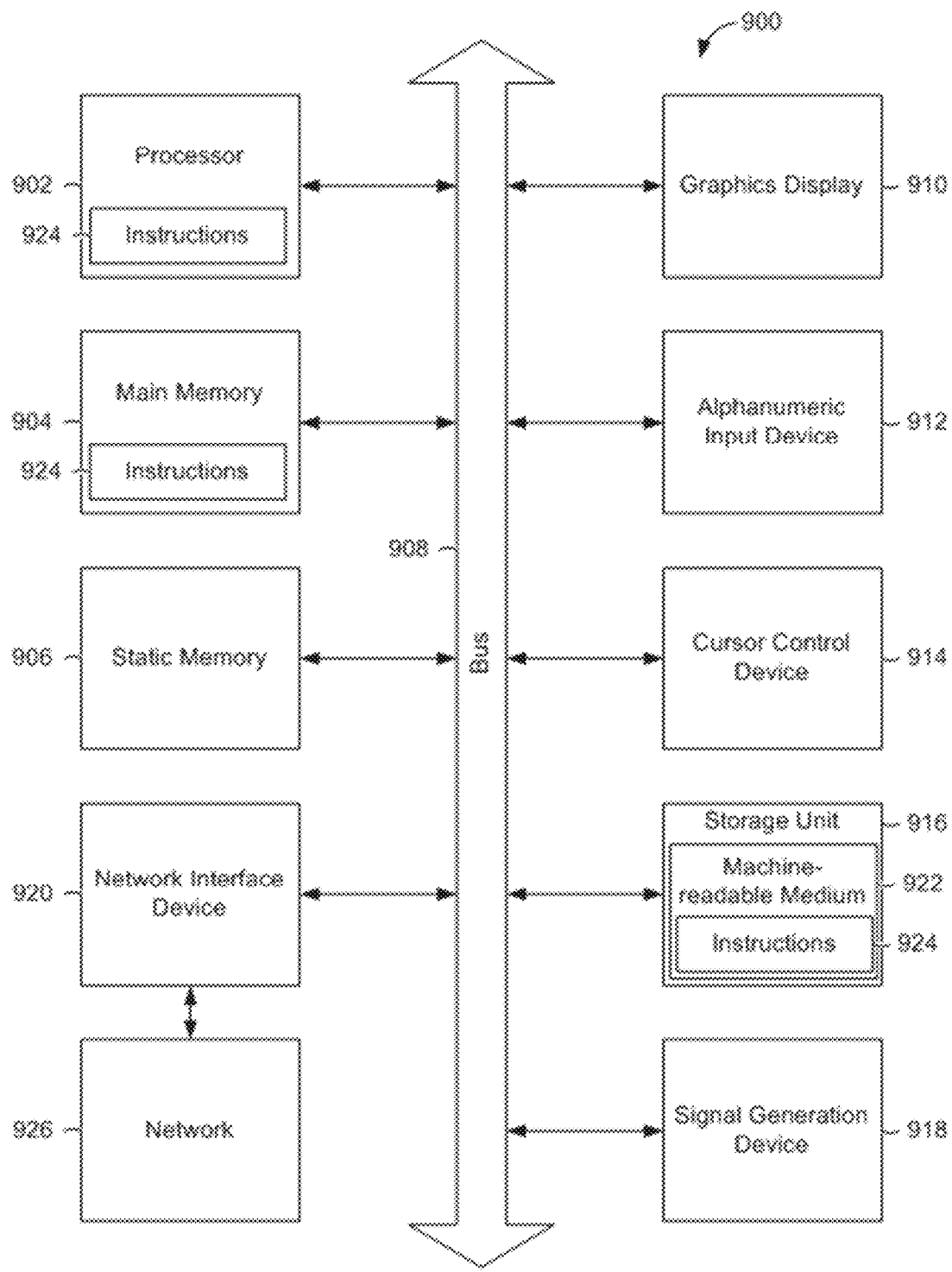
FIG. 9 is a block diagram representation of an apparatus for use in a live content streaming system.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 190) via the network interface device 920.

It will be appreciated that techniques are provided to enable live streaming of content at different rates using a single transcoder per media stream output by the primary device. In some embodiments, a single transcoding circuit or hardware corresponding to a given video program output can be used to effectively provide content at multiple different bitrates in parallel. In other words, from a receiving device's viewpoint, the streaming device would appear to have the ability to simultaneously offer the same content at multiple different bitrates. In some embodiments, a middleware running on a primary device may perform an all-software implementation of the transcoding module 204.

It will further be appreciated that the bitrate of the live streaming can be controlled so that the rate at which the bitrate changes is below a threshold. In some embodiments, the threshold may be based on a capability of the receiving device. In some embodiments, a query/response procedure may be used to provide information about the capability to the streamer of the live content.

The disclosed and other embodiments, modules and the functional operations described in this document (a network interface, a content list advertiser, a play-out request receiver, a transcoder, a list updater, a request checker, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. A method comprising:
    receiving, by a first device, at least a portion of media content from a second device, wherein the media content is associated with a step size threshold constraining changes in bitrates for bitrate requests to at least one transcoder, and wherein the step size threshold is related to a constraint on changes in output bitrates of the at least one transcoder;
    receiving a file including a number of entries defining bitrates at which the media content is available for the first device, the bitrates defined by the number of entries including a first bitrate, a second bitrate that is greater than the first bitrate, and a third bitrate that is greater than the second bitrate, wherein a difference between the first bitrate and the second bitrate satisfies the step size threshold, and wherein a difference between the second bitrate and the third bitrate satisfies the step size threshold;

sending, by the first device to the second device, an indication of a selection of the first bitrate from the file;

receiving, by the first device, transcoded media content from the second device, the transcoded media content being transcoded to the first bitrate; and receiving an updated file including the first bitrate, the second bitrate, and a fourth bitrate that is less than the first bitrate, wherein a difference between the first bitrate and the fourth bitrate satisfies the step size threshold.

2. The method of claim 1, wherein the media content is transcoded to the first bitrate based on the first bitrate being different from a bitrate at which the media content is accessed by the first device.

3. The method of claim 1, wherein the first bitrate, the second bitrate, and the fourth bitrate are provided in the updated file for selection by the first device.

4. The method of claim 1, further comprising:
receiving the updated file in response to the media content being transcoded to the first bitrate.

5. The method of claim 1, further comprising:
accessing, by the first device, one or more program segments of the media content.

6. The method of claim 1, wherein the first device is a mobile device or a computer, and wherein the second device includes the at least one transcoder.

7. A first device comprising:
one or more processors; and
memory accessible to the one or more processors, the memory storing instructions, which upon execution by the one or more processors, cause the one or more processors to perform operations to:
receive at least a portion of media content from a second device, wherein the media content is associated with a step size threshold constraining changes in bitrates for bitrate requests to at least one transcoder, and wherein the step size threshold is related to a constraint on changes in output bitrates of the at least one transcoder;
receive a file including a number of entries defining bitrates at which the media content is available for the first device, the bitrates defined by the number of entries including a first bitrate, a second bitrate that is greater than the first bitrate, and a third bitrate that is greater than the second bitrate, wherein a difference between the first bitrate and the second bitrate satisfies the step size threshold, and wherein a difference between the second bitrate and the third bitrate satisfies the step size threshold;
send, to the second device, an indication of a selection of the first bitrate from the file;
receive transcoded media content from the second device, the transcoded media content being transcoded to the first bitrate based on the selection of the first bitrate; and
receive an updated file including the first bitrate, the second bitrate, and a fourth bitrate that is less than the first bitrate, wherein a difference between the first bitrate and the fourth bitrate satisfies the step size threshold.

8. The first device of claim 7, wherein the media content is transcoded to the first bitrate based on the first bitrate being different from a bitrate at which the media content is accessed by the first device.

9. The first device of claim 7, wherein the first bitrate, the second bitrate, and the fourth bitrate are provided in the updated file for selection by the first device.

10. The first device of claim 7, wherein the instructions, upon execution by the one or more processors, cause the one or more processors to perform operations to:
receive the updated file in response to the media content being transcoded to the first bitrate.

11. The first device of claim 7, wherein the first device is a mobile device or a computer, and wherein the second device includes the at least one transcoder.

12. A non-transitory computer-readable medium of a first device having stored thereon instructions that, when executed by one or more processors, cause the one or more processors to:
receive at least a portion of media content from a second device, wherein the media content is associated with a step size threshold constraining changes in bitrates for bitrate requests to at least one transcoder, and wherein the step size threshold is related to a constraint on changes in output bitrates of the at least one transcoder;
receive a file including a number of entries defining bitrates at which the media content is available for the first device, the bitrates defined by the number of entries including a first bitrate, a second bitrate that is greater than the first bitrate, and a third bitrate that is greater than the second bitrate, wherein a difference between the first bitrate and the second bitrate satisfies the step size threshold, and wherein a difference between the second bitrate and the third bitrate satisfies the step size threshold;
send, to the second device, an indication of a selection of the first bitrate from the file;
receive transcoded media content from the second device, the transcoded media content being transcoded to the first bitrate based on the selection of the first bitrate; and
receive an updated file including the first bitrate, the second bitrate, and a fourth bitrate that is less than the first bitrate, wherein a difference between the first bitrate and the fourth bitrate satisfies the step size threshold.

13. The non-transitory computer-readable medium of claim 12, wherein the media content is transcoded to the first bitrate based on the first bitrate being different from a bitrate at which the media content is accessed by the first device.

14. The non-transitory computer-readable medium of claim 13, wherein the instructions, when executed by the one or more processors, cause the one or more processors to:
receive the updated file in response to the media content being transcoded to the first bitrate.

15. The non-transitory computer-readable medium of claim 12, wherein the first device is a mobile device or a computer, and wherein the second device includes the at least one transcoder.

* * * * *